(No Model.)
R. EICKEMEYER.
HAT BLOCK CHUCK.
No. 317,104. Patented May 5, 1885.
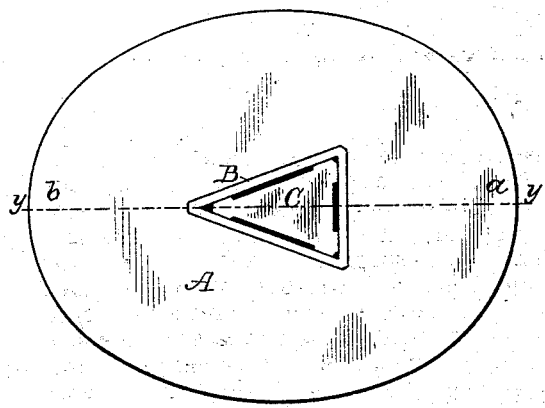
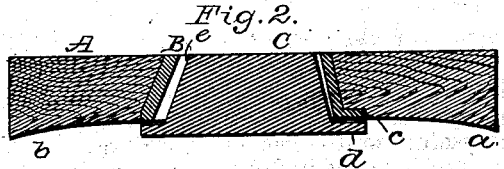
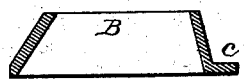
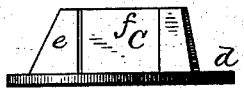
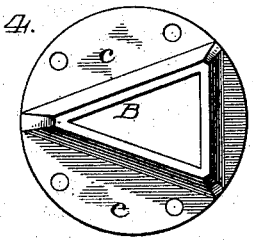
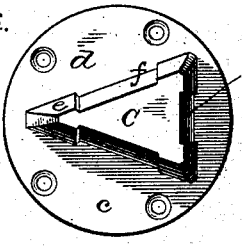
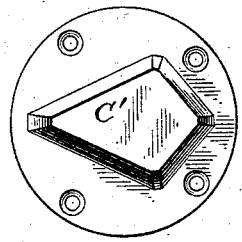
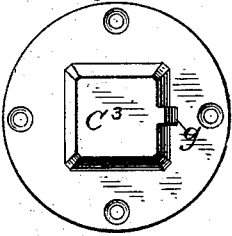
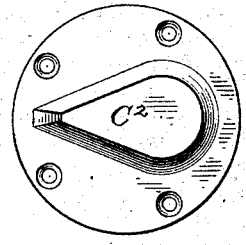
Attest:
Philip F. Larner
Howell T. Battle
Inventor:
Rudolf Eickemeyer
By M. C. Wood
Attorney.

UNITED STATES PATENT OFFICE.

RUDOLF EICKEMEYER, OF YONKERS, NEW YORK.

HAT-BLOCK CHUCK.

SPECIFICATION forming part of Letters Patent No. 317,104, dated May 5, 1885.

Application filed January 24, 1885. (No model.)

*To all whom it may concern:*

Be it known that I, RUDOLF EICKEMEYER, of Yonkers, in the county of Westchester and State of New York, have invented certain new and useful Improvements in Hat-Block Chucks; and I do hereby declare that the following specification, taken in connection with the drawings furnished and forming a part of the same, is a clear, true, and complete description of my invention.

The objects sought by me are to provide a chuck for a hat-block which will securely hold the block against lateral movement, will admit of the free and ready detachment of the block therefrom, will accurately center said block, and will also prevent a block from being inaccurately placed thereon, which is a matter of special importance with "egg" or "hat-oval" blocks having varied front and rear outlines.

My chucks have special value for use in connection with such hat-machines as operate upon hats while mounted either upon a full-crown block or a brow-block, and in which a hat should be firmly held, accurately centered, and properly positioned with reference to its front and rear ends, and they were devised with special reference to their use in certain brim-curling machines heretofore patented by me, although they have much value in various other connections.

My chucks, like all others, may have an axial-threaded center for their bases, or said bases may be provided with a flange having suitable holes by which they may be permanently attached to the bed of any hat-machine in which they are to used, or to the chuck of any lathe capable of turning hat-blocks, so that in this latter case a block having been turned from a mass of wood mounted upon one of my chucks will thereafter be invariably properly mounted in any hat-machine provided with a counterpart of the block-chuck upon which said block was turned.

My novel chucks may be almost indefinitely varied in form and outline without departure from my invention. In addition to the base hereinbefore referred to my chucks embody a shell, which, as a socket or mortise, snugly fits upon the base, operating as a tenon. One essential feature of form or construction is what may be termed "pyramidal," or, in other words, the base must be smaller at the top than at the bottom, and therefore its sides and ends are inclined, and the shell is correspondingly chambered to snugly fit the base. The next essential feature is that the base of the chuck can only receive its shell in one certain position; or, in other words, the base and the shell must be so constructed that a hat-block having the shell thereon cannot be shifted end for end and then mounted on the base. This is accomplished by providing a corresponding peculiarity of shape at some portion of the sides or ends of the base and of the interior of the shell, so that the one must accurately register with the other before said base can be made to occupy the shell.

Broadly stated, my invention consists of a hat-block chuck embodying a base which has inclined sides or ends, or both, and a correspondingly-chambered shell or socket, which is registered to fit said base only when in one certain position.

To more particularly describe my invention, I will refer to the accompanying drawings, in which—

Figure 1 is a top view of a "brow-block" provided with a chuck constructed in accordance with my invention. Fig. 2 is a diametrical section of the same on line $y$, Fig. 1. Figs. 3 and 4 are respectively sectional and plan views of the shell or socket of my chuck in an approved form. Figs. 5 and 6 are respectively side and plan views of the base of my chuck in an approved form. Figs. 7 to 9, inclusive, illustrate in plan other forms of bases which may be employed without departure from my invention.

The hat-block A is here shown to be a brow-block; but instead thereof a full-crown block can be used when required. The end $a$ of said block is the front, and the rear is at $b$, and the chuck will not admit of any variation in the positions of these two ends.

The chuck shell or socket B is provided with a flange, $c$, having holes therein, by which it may be secured by means of screws to the under side of a hat-block, the shell then occupying a recess centrally cut therefor in said block. The chuck-base C is also provided with a flange, $d$, also having holes, whereby it may by means of screws or bolts be secured upon the bed of a hat-machine, or upon the face-plate of a lathe-chuck if hat-blocks are to be turned thereon, and in this latter case, if deemed desirable, the base may be provided with a threaded central hole, so as to be readily mounted upon a threaded hub or spindle projecting from the lathe-chuck.

As shown in Figs. 1 to 6, inclusive, the base C is triangular in outline, and has inclined or tapered sides $e$, and the interior of the shell B is correspondingly chambered, so that when said shell is placed upon said base the latter will be wedged within the shell, thus centering and securely holding the block against lateral displacement. As seen in Figs. 5 and 6, the base is cut away at various points, as at $f$; but this is only done for reducing the area of contact between the sides of the base and the interior of the shell, and thereby enabling the block and shell to be more easily detached from the base. The proper registering of the base and shell is secured by their triangular outline, which renders it impossible for the hat-block to be reversed in position or placed "end for end," and therefore whenever the block is mounted on the base and "chucked" the front and rear ends of said block will invariably occupy their proper positions.

It will be seen that the wedge action between the base and shell is in no manner dependent upon the triangular form, and also that this latter is not absolutely essential for securing the accurate registration of the base and shell—as, for instance, in Fig. 7, the base C' has what may be termed a "diamond-shaped outline;" but it has two long sides and two short ones, so that a shell correspondingly chambered could not be reversed in position thereon. So, also, in Fig. 8, the base $C^2$, having a pointed oval outline, will secure a proper registration, and not admit of the reversal of a shell thereon. In Fig. 9 the outline of the base $C^3$ is substantially rectangular; but at one side it is provided with a feather or spline, $g$, so that its shell having a corresponding groove to receive said spline will properly register, and cannot be reversed in position.

Various other outlines equally desirable might obviously be employed, inasmuch as the matter of form is only involved for providing the wedge-like action, and also for the registration of the shell with the base, which will invariably result in the accurate location of the front and rear ends of a hat-block in their proper positions.

Having thus described my invention, I claim as new and desire to secure by Letters Patent—

The hat-block chuck, substantially as hereinbefore described, embodying a base having inclined sides and a correspondingly-chambered shell which is registered to fit upon said base in but one position, whereby an egg-oval hat-block mounted on said chuck will be properly centered, securely held against lateral displacement, and invariably have its front and rear ends accurately located in their respective positions, as set forth.

RUDOLF EICKEMEYER.

Witnesses:
PHILIP F. LARNER,
HOWELL BARTLE.